(12) United States Patent
Shida et al.

(10) Patent No.: US 6,776,807 B2
(45) Date of Patent: Aug. 17, 2004

(54) METHOD OF MANUFACTURING A BATTERY

(75) Inventors: Masayuki Shida, Fukushima (JP); Sachio Akahira, Fukushima (JP); Takanobu Yoshino, Fukushima (JP); Kazuhiro Imaizumi, Fukushima (JP); Tsuyoshi Sugiyama, Miyagi (JP)

(73) Assignee: Sony Corporation, Tokyo (JP)

( * ) Notice: Subject to any disclaimer, the term of this patent is extended or adjusted under 35 U.S.C. 154(b) by 231 days.

(21) Appl. No.: 09/812,218

(22) Filed: Mar. 19, 2001

(65) Prior Publication Data

US 2002/0029465 A1 Mar. 14, 2002

(30) Foreign Application Priority Data

Mar. 17, 2000 (JP) ..................................... P2000-076615
Mar. 17, 2000 (JP) ..................................... P2000-076616

(51) Int. Cl.$^7$ ........................... H01M 10/04; B05D 1/40
(52) U.S. Cl. ........................ 29/623.5; 427/58; 429/137
(58) Field of Search ........................ 29/623.5; 427/58; 429/136, 137, 139; 118/209, 676, 678

(56) References Cited

U.S. PATENT DOCUMENTS

| | | | | |
|---|---|---|---|---|
| 4,925,751 A | * | 5/1990 | Shackle et al. | 429/314 |
| 5,496,407 A | * | 3/1996 | McAleavey | 118/677 |
| 5,766,356 A | * | 6/1998 | Kurimoto | 118/410 |
| 5,776,209 A | * | 7/1998 | Fauteux et al. | 29/623.5 |
| 5,865,860 A | * | 2/1999 | Delnick | 29/623.5 |
| 5,925,283 A | * | 7/1999 | Taniuchi et al. | 252/62.2 |
| 6,027,835 A | * | 2/2000 | Fukumura et al. | 429/233 |
| 6,387,564 B1 | * | 5/2002 | Yamashita et al. | 429/132 |

FOREIGN PATENT DOCUMENTS

| | | | |
|---|---|---|---|
| JP | 2000-251920 A | * | 9/2000 |
| JP | 2000-268870 A | * | 9/2000 |

OTHER PUBLICATIONS

IPDL JPO Machine Translation for JP 2000–251920 A (publication date Sep. 2000).*

IPDL JPO Machine Translation for JP 2000–268870 A (publication date Sep. 2000).*

* cited by examiner

*Primary Examiner*—Susy Tsang-Foster
(74) *Attorney, Agent, or Firm*—Sonnenschein, Nath & Rosenthal LLP (57) ABSTRACT

To provide a method of manufacturing a battery capable of providing an equal amount of electrolyte in each battery and of enhancing productivity and coating machines employed thereof. The sensor detects a boundary from the collector exposed region C of the belt-shaped positive electrode to the positive electrode mixture layer exposed region B, on the basis of the detection timing, the shutter is withdrawn to open the flowing path and the proportioning pomp is driven. Following this, when the sensor detected a boundary from the positive electrode mixture layer exposed region B to a collector exposed region C, and on the basis of the detection timing, the shutter is protruded inside the flowing path to close the flowing path and the proportioning pump stops. As a result of this, the electrolyte stops to be delivered from the nozzle. The electrolyte layers are intermittently formed by repeating the same procedures. With the proportioning pump, the electrolyte is evenly applied to pressure in order to push the electrolyte from the nozzle, so that a given amount of the electrolyte can be delivered. Thereby, the electrolyte layers, which are thin and even in thickness in width and longitudinal directions can be formed and an amount of the electrolyte included in each of the batteries can be uniform.

12 Claims, 10 Drawing Sheets

METHOD OF MANUFACTURING A BATTERY

RELATED APPLICATION DATA

The present application claims priority to Japanese Applications Nos. P2000-076615 filed Mar. 17, 2000, and P2000-076616 filed Mar. 17, 2000, which applications are incorporated herein by reference to the extent permitted by law.

BACKGROUND OF THE INVENTION

The present invention relates to a method of manufacturing a battery on which electrolyte layers are formed by coating electrolyte on electrodes and coating machines employed thereof.

Recently, portable electric equipment has been developed, hence, a battery has an important role as an electric source of such portable electric equipment. The portable electric equipment is required to be miniature and lightweight, in response to this request, the battery is also requested to be miniature in accord with accommodating space inside the portable electric equipment, and to be lightweight in order not to increase weight of the portable electric equipment as possible.

As the battery responding to such a request, in replace of a lead-acid battery and a nickel-cadmium battery, which used to be mainstream in the secondary battery, a lithium secondary battery and a lithium ion secondary battery whose energy density and output density are higher than that of these batteries are expected.

Conventionally, in the lithium secondary battery, or the lithium ion secondary battery, liquid-type electrolyte, which is dissolved lithium ion in nonaqueous solvents is employed as a material working for ion conduct (hereinafter, it is referred to as electrolyte liquid). With this reason, a package must be made of a metal case for preventing leakage and strictly maintain hermeticity inside the battery. However, with the metal case for the package, it is extremely difficult to produce a battery such as a sheet-like battery, which is thin and flat, a card-like battery, which is thin and small, or a battery, which is flexible and freer in shape.

In replace of the electrolyte liquid, it is therefore suggested that a secondary battery is employed such as gel-type electrolyte, which macromolecular compounds has electrolyte liquid including lithium salt, solid-type electrolyte in which lithium salt is diffused to macromolecular compounds having ion conductivity, or electrolyte in which a solid-type inorganic conductor has lithium salt. In these batteries, there is no leakage, so that the metal case is unnecessary as a package. Consequently, miniaturization reduction in weight and thickness in size of the battery by using a laminate film and the like as a package material are obtained to realize a battery freer in shape.

In case of using gel-type electrolyte, with a method described later, electrolyte layers are formed on electrode mixture layers formed on electrode collector. First, a belt-shaped electrode comprising a plurality of the electrode mixture layers intermittently formed on the belt-shaped electrode collector is impregnated in a tank accommodating electrolyte. Next, the belt-shaped electrode is pulled up from the tank and scraped the electrolyte adhering to both faces with a pair of scoops (doctor knives) in order to form the electrolyte layers having a predetermined thickness on the both faces of the belt-shaped electrode. After this, the belt-shaped electrode is cut into a plurality of electrodes between the electrode mixture layers, which are intermittently formed.

In the method of manufacturing the electrolyte layers like this, in case that any accidents happen, which stops the electrode from being conveyed, or decreases a speed at which the electrode is conveyed when the electrode is impregnated, a part of the electrode positioned in the tank when the accidents happen, absorbs the electrolyte than required, which causes a trouble to control an amount of the electrolyte. In this case, it requires that regions where the amount of the electrolyte increases are removed, however, a thickness of the electrolyte layers is almost the same between failure regions and normal regions, which requires control procedures such that the failure regions are marked every time when the accidents happen.

In case that the electrode mixture layers are formed on different regions in the surface and the back when forming the electrode mixture layers on the both faces of the electrode collector, a thickness of the electrode varies in part. Consequently, it is difficult to achieve the electrolyte having an even thickness by a method of scraping the electrode with the pair of scoops.

With a reason that the belt-shaped electrode comprising a plurality of the electrode mixture layers intermittently formed on the electrode collector is impregnated in the tank so as to form the electrolyte layers, the electrolyte directly adheres to the electrode collector on regions where the electrode mixture layers are not formed. In this case, when a lead, which becomes an electrode terminal, is attached to the regions on which the electrode mixture layers are not formed, a stripping electrolyte process is required.

SUMMARY OF THE INVENTION

The present invention has been achieved in consideration of the above problems and its object is to provide a method of manufacturing a battery excellent in productivity and a coating machine employed thereof.

A method of manufacturing a battery according to the present invention is a method of manufacturing a battery provided with electrolyte layers in a positive electrode and a negative electrode, and comprises steps of forming electrolyte layers by pushing electrolyte at least in one side of either the positive electrode or the negative electrode by means of a pressurization means, further, of forming a plurality of the electrolyte layers by intermittently coating the electrolyte at least on one face of a belt-shaped electrode comprising a plurality of electrode mixture layers formed on electrode collector, and of cutting the electrode intermittently coated by the electrolyte between the plurality of the electrolyte layers.

A coating machine according to the present invention comprises a nozzle unit for applying coating materials, a conveying means for conveying a coated body relative to the nozzle unit in a position opposite to the nozzle unit, a pressurization means for applying the coating materials on the coated body while being conveyed with the nozzle unit by the conveying means, a closing means for closing a flowing path of the coating materials inside the nozzle unit, and a control means for intermittently driving the closing means in a manner to intermittently deliver the coating materials from the nozzle unit.

In a method of manufacturing a battery according to the present invention, with a reason that electrolyte layers are formed by pushing electrolyte with a pressurization means, even if any accidents such that a forming machine stops in the middle of forming the electrolyte layers happen, the electrolyte layers formed on an electrode can attain even thickness.

In a coating machine according to the present invention, by means of intermittently driving a closing means, coating materials applied to pressure by a pressurization means can be applied on a coated body-to-be-coated while being conveyed with a nozzle unit. Thereby, electrolyte can be formed on a belt-shaped electrode comprising a plurality of electrode mixture layers is intermittently formed on electrode collector, and by means of cutting the electrode between the electrolyte layers, stacked bodies provided with the electrolyte layers formed on the electrode mixture layers can be formed sequentially.

Other and further objects, features and advantages of the invention will appear more fully from the following description.

BRIEF DESCRIPTION OF THE DRAWINGS

These and other objects and features of the present invention will become clear from the following description of the preferred embodiments given with reference to the accompanying drawings, in which:

FIGS. 4A and 4B are plan views explaining the method of manufacturing the battery relative to the embodiment of the present invention;

FIGS. 8A and 8B are enlarged cross sectional views showing the nozzle unit illustrated in FIG. 7 and cross sectional views explaining the method of manufacturing the battery relative to the embodiment of the present invention;

FIGS. 9A and 9B are cross sectional views explaining the method of manufacturing the battery relative to the embodiment of the present invention;

DETAILED DESCRIPTION OF THE PREFERRED EMBODIMENTS

Embodiments of the invention will be described in detail hereinbelow by referring to the drawings.

First, a configuration of a secondary battery manufactured by a method of manufacturing a battery relative to the embodiment will be explained.

Figure 1:
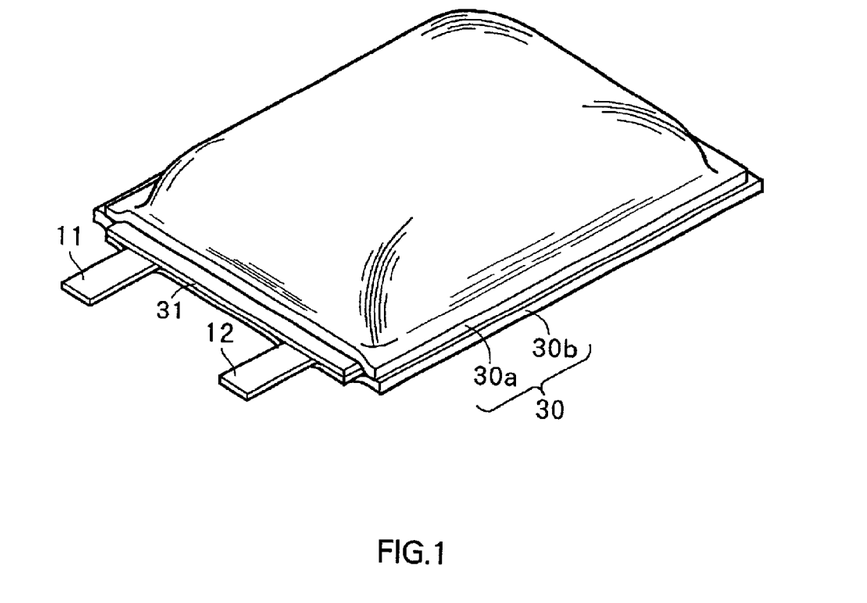
FIG. 1 is a perspective view showing a structure of a battery manufactured using a method of manufacturing a battery relative to an embodiment of the present invention.
Figure 2:
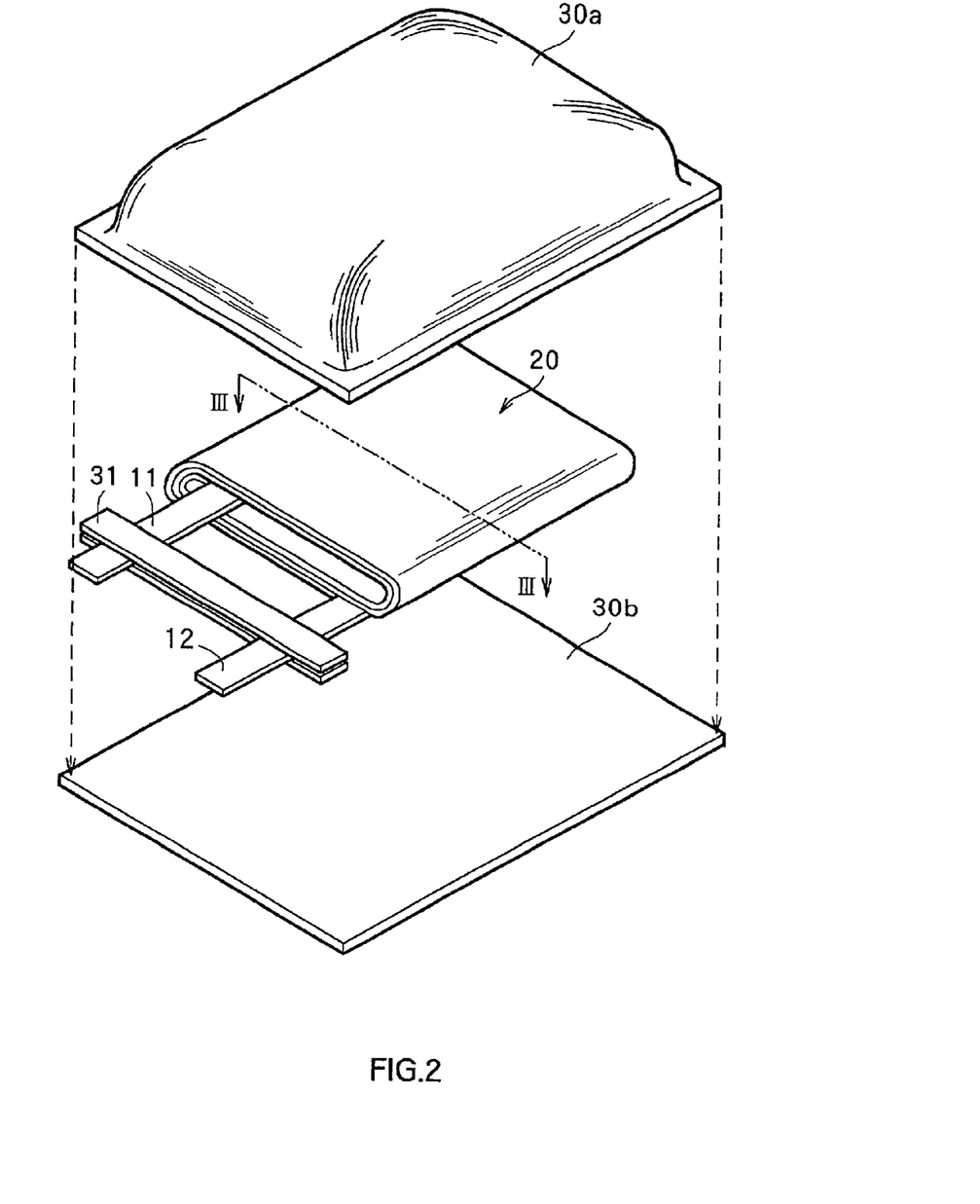
FIG. 2 is a separated perspective view showing the battery illustrated in FIG. 1 in part.

FIG. 1 is a view showing the structure of the secondary battery manufactured by the method of manufacturing the battery relative to the embodiment. FIG. 2 is a view showing the separated structure of the secondary battery illustrated in FIG. 1. This secondary battery has a structure that a rolled electrode 20 to which a positive lead 11 and a negative lead 12 is attached, is sealed by a package member 30.

Figure 3:
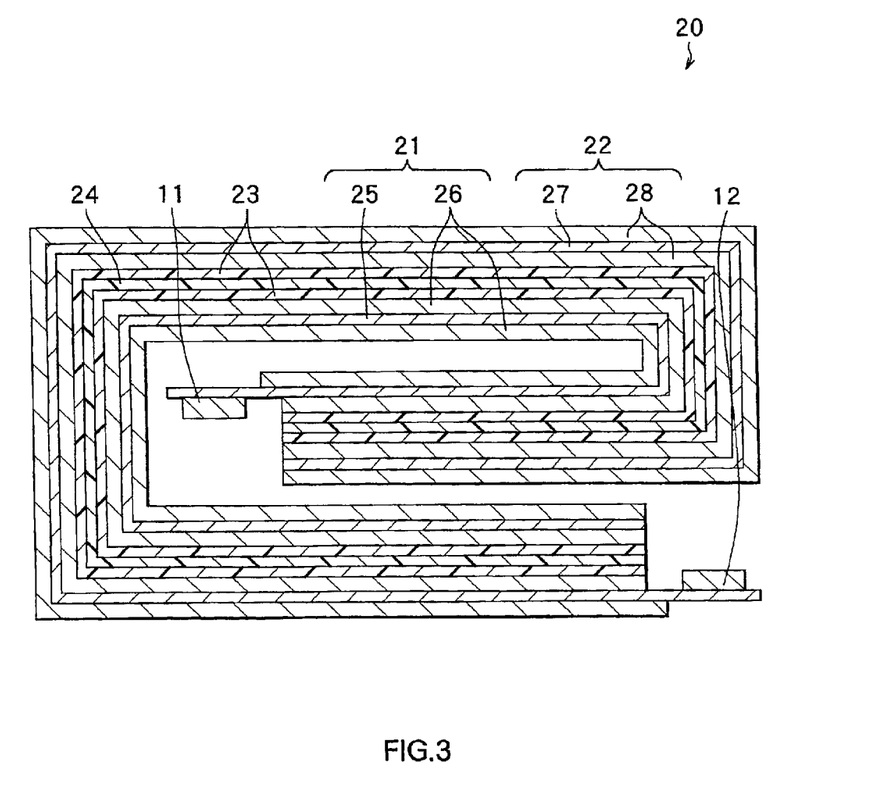
FIG. 3 is a cross sectional view corresponding to a III—III line of a rolled electrode illustrated in FIG. 2.

FIG. 3 is a view showing a cross sectional structure corresponding to a III—III line of the rolled electrode 20 illustrated in FIG. 2. The rolled electrode 20 is a structure such that a positive electrode 21 and a negative electrode 22 are stacked in a manner to sandwich gel-type electrolyte layers 23 therebetween, which is rolled many times. Between the positive electrode 21 and a negative electrode 22, a separator 24 is inserted with the electrolyte layers 23 in-between. For simplification of the drawings, FIG. 3 shows the rolled electrode 20, which is rolled only once.

The positive electrode 21 has a positive collector layer 25 and positive electrode mixture layers 26 disposed on both faces of the positive collector layer 25. One end of the positive collector layer 25 in a longitudinal direction is exposed. The negative electrode 22 has a negative collector layer 27 and negative electrode mixture layers 28 disposed on the both faces of the negative collector layer 27. One end of the negative collector layer 27 in a longitudinal direction is exposed.

The positive electrode lead 11 and the negative electrode lead 12 are led from an inside of the package member 30 toward the outside, for example, in the same direction. A part of the positive electrode lead 11 is connected to the exposed part of the positive collector layer 25 inside the package member 30. On the other hand, a part of the negative electrode terminal 12 is connected to the exposed part of the negative collector layer 27 inside the package member 30. As shown in FIGS. 1 and 2, the package member 30 is comprised of a pair of rectangular films 30a and 30b. The positive electrode lead 11 and the negative electrode lead 12 adheres to the pair of films 30a and 30b with films 31 for enhancing adhesion in-between in order to prevent the entry of the air.

Next, a method of manufacturing this battery is described. In connection with this, here, a case of manufacturing a plurality of the batteries is explained.

Figure 5:
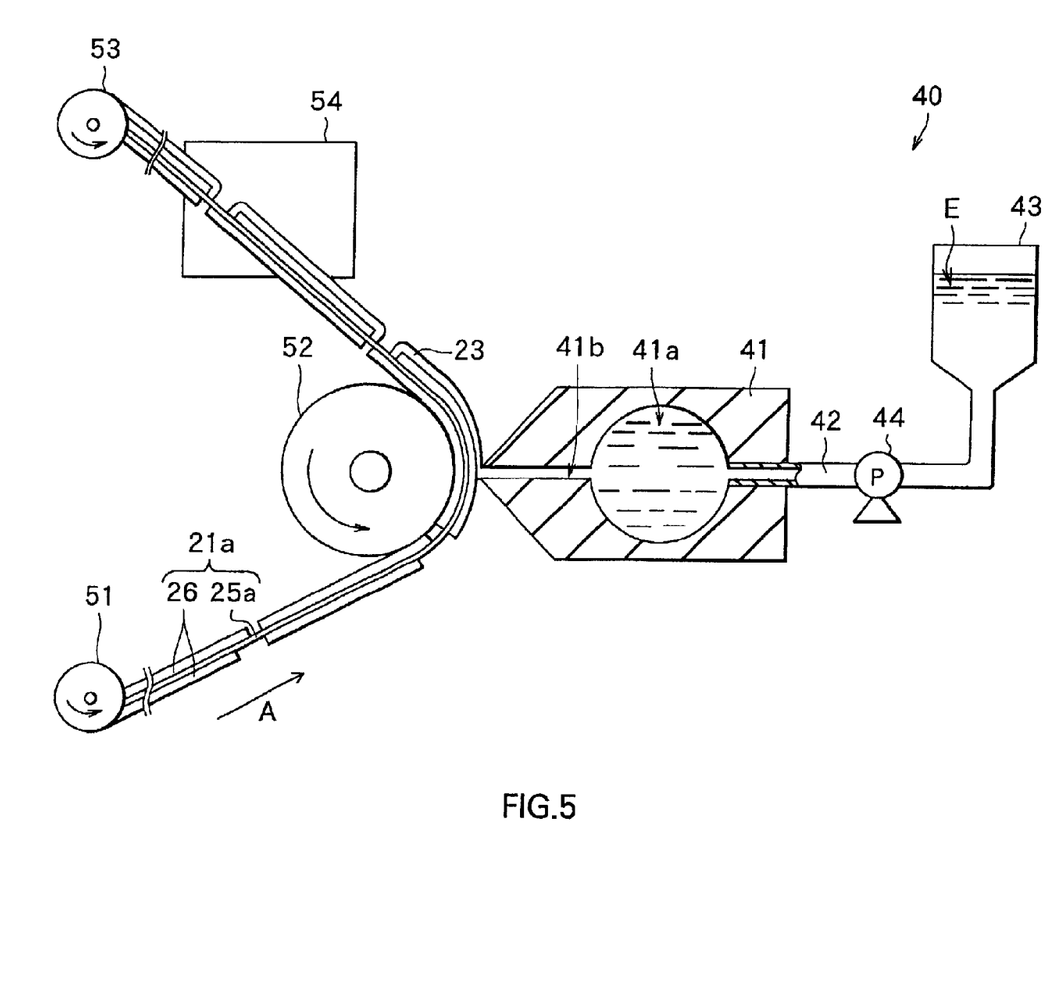
FIG. 5 is a cross sectional view partly showing a schematic configuration of a coating machine used when forming electrolyte layers of the battery illustrated in FIG. 1.

Initially, for instance, on a belt-shaped positive electrode collector 25a (see FIG. 5) whose thickness is in the range of 5 $\mu$m to 50 $\mu$m, a plurality of the positive electrode mixture layers 26 whose thickness is in the range of 50 $\mu$m to 300 $\mu$m is intermittently formed in order to produce a belt-shaped positive electrode 21a (see FIG. 5). The belt-shaped positive electrode 21a becomes the above-mentioned positive electrode 21 (see FIG. 3) by separating individually. Specifically, producing the belt-shaped positive electrode 21a is conducted with the following manners. First, positive electrode mixtures including positive electrode active materials, conducting agents such as carbon black or graphite, and binders such as polyvinylidene fluoride and so on, are diffused to solvents such as dimethylformaldehyde or N-methylpyrrolidone so as to make positive electrode mixture slurry. Then, the positive electrode mixture slurry is intermittently applied onto a surface and a back of the belt-shaped positive electrode collector 25a, then the positive electrode mixture slurry applied onto the belt shaped positive electrode collector 25a, then, the belt-shaped positive electrode collector 25a is dried and subjected to compression molding. The belt-shaped positive electrode collector 25a is made of metal foil such as aluminum (Al) foil, nickel (Ni) foil or stainless foil.

At this point, as for the positive electrode active materials, metal oxide, metal sulfide, or one kind or more than two kinds materials among specific macromolecule materials are preferably employed. The positive electrode active materials can be selected depending on its purpose for use, however, if high energy density is desired, lithium (Li) mixed oxide, which mainly includes $Li_xMO_2$ is preferable. A value of x is various in accord with a charge-discharge state of the battery, and usually satisfies $0.05 \leq x \leq 1.12$. In this composition formula, M is preferably more than one kind of transition metal, and more preferably, at least, one of materials among cobalt (Co), nickel and manganese (Mn). A specific example of such lithium mixed oxide can satisfy $LiNi_yCo_{1-y}O_2$ ($0 \leq y \leq 1$) or $LiMn_2O_4$.

After producing the belt-shaped electrode 21a, the electrolyte layers 23 are respectively formed on surfaces of the positive electrode mixture layers 26, which are intermittently formed by means of a method, which will be described later.

In case that the mixture agent layers (the positive electrode mixture layers 26, the negative electrode mixture layers 28) are formed on the both faces of the belt-shaped electrode collectors (the belt-shaped positive electrode collector 25a, the belt-shaped negative electrode collector 27), and the electrolyte layers 23 are respectively formed thereon, a single face is formed at each time.

Figure 7:
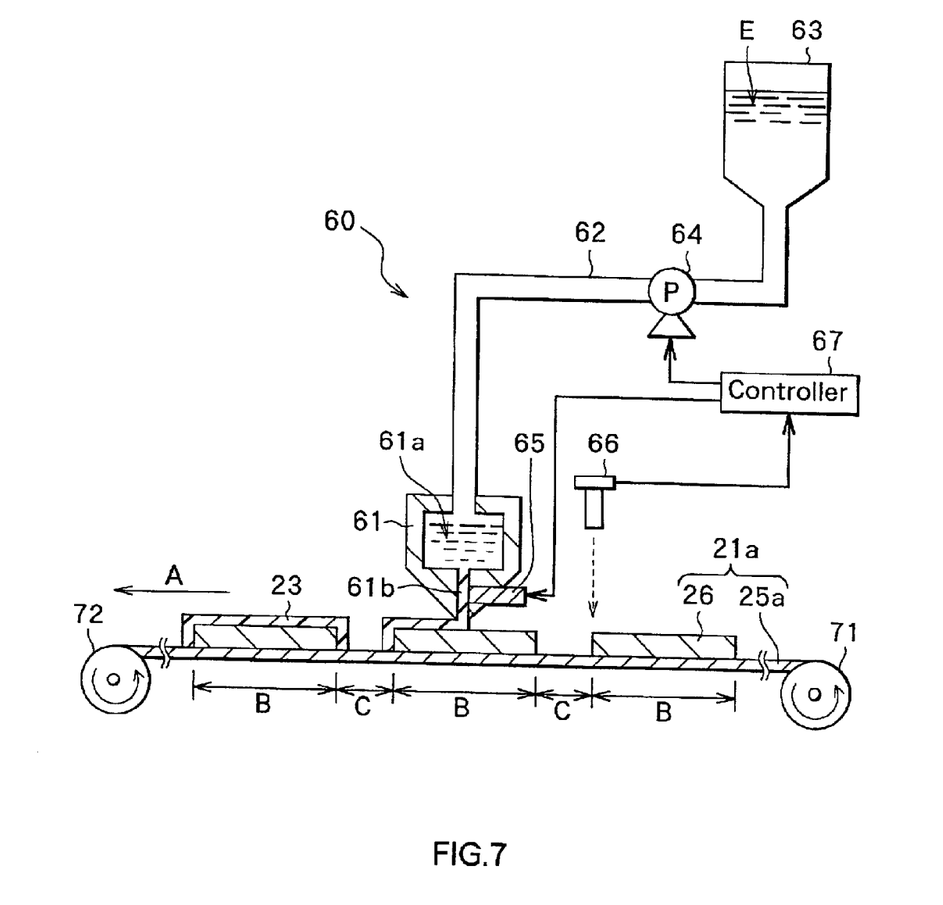
FIG. 7 is a cross sectional view partly showing a schematic configuration of another coating machine used when forming the electrolyte layers of the battery illustrated in FIG. 1.

FIGS. 5 and 7 are views showing configuration examples of coating machines employed here.

The coating machine illustrated in FIG. 5 is provided with an electrolyte-delivering machine 40 for delivering electrolyte E, a conveying roller 51, a backup roller 52 and a winding roller 53 as a conveying means for conveying a belt-shaped electrode (here, the belt-shaped positive electrode 21a). The backup roller 52 is disposed in a manner to be opposite to a nozzle 41, and a diameter of the backup roller 52 is about 1000 times as large as a total thickness of the belt-shaped electrode collector, the mixture agent layer and the electrolyte layer 23.

The electrolyte-delivering machine 40 has the nozzle 41, which includes a filling unit 41a for filling the electrolyte E. One end of a supplying tube 42 is in connection with the filling unit 41a, and the other end that is in connection with a tank 43, which accommodates the electrolyte E. In the middle of the supplying tube 42, a proportioning pump 44 is disposed as a pressurization means. In the electrolyte-delivering machine 40, an unillustrated shutter is disposed in the middle of a flowing path 41b where the electrolyte E of the nozzle 41 passes through and by driving the shutter, the flowing path 41b can open and close. In connection with this, here, although the proportioning pump 44 is disposed outside the nozzle 41, a gear pump may be provided in the nozzle 41 as a pressurization mechanism.

In this coating machine, the belt-shaped electrode 21a is carried from the conveying roller 51 in a horizontal direction, then conveyed at a fixed speed in a direction of the backup roller 52 to be applied the electrolyte E on the positive electrode mixture layers 26, and rolled by the winding roller 53. A thickness of the electrolyte layers 23 is adjustable by adjusting a distance from the backup roller 52 to the nozzle 41.

A coating machine illustrated in FIG. 7 is provided with a electrolyte-delivering machine 60 for delivering electrolyte E, a conveying roller 71 and a winding roller 72 as a conveying means for conveying a belt-shaped electrode (here, the belt-shaped positive electrode 21a).

The electrolyte-delivering machine 60 has a nozzle 61, which includes a filling unit 61a for filling the electrolyte E. One end of a supplying tube 62 is in connection with the filling unit 61a and the other end is in connection with a tank 63, which accommodates the electrolyte E. In the middle of the supplying tube 62, a proportioning pump 64 as a pressurizing means is disposed. In the middle of a flowing path 61b where the electrolyte E of the nozzle 61 passes through, a shutter 65 is disposed as a flowing path closing means, which can open and close this flowing path 61b. The shutter 65 is movable in either a position in which the flowing path 61b closes or a position in which the flowing path 61b opens. In connection with this, here, although the proportioning pump 64 is disposed outside the nozzle 61, a gear pump may be provided in the nozzle 61 as a pressurizing means.

The coating machine also has a sensor 66 as a detecting means (for example, a reflex photo switch) near the vicinity of the nozzle 61 in a side of the winding roller 71. The sensor 66 detects a position of the belt-shaped electrode (here, the belt-shaped positive electrode 21a) while being conveyed and transmits a detecting signal to a controller 67. The controller 67 receives the detecting signal and controls the proportioning pump 64 and the shutter 65 as described later.

In this coating machine, the belt-shaped electrode (here, the belt-shaped positive electrode 21a) is carried from the conveying roller 71 in a horizontal direction and conveyed at a fixed speed in a direction shown as A in FIG. 7 while being conveyed, the electrolyte E is intermittently applied on the positive electrode mixture layers 26 in response to opening and closing of the shutter 65, and rolled with the winding roller 72. In connection with this, a thickness of the electrolyte layers 23 is adjustable by moving the nozzle 61 in an up-and-down direction for adjusting a distance from a delivering open (see FIGS. 8A and 8B) of the nozzle 61 to the positive electrode mixture layers 26.

In the embodiment, when forming the electrolyte layers 23, initially, the electrolyte E is accommodated into the above-mentioned tank 63 of the electrolyte-delivering machine 60. As for the electrolyte E, materials including lithium salt as electrolyte salt, nonaqueous solvents, which dissolve the lithium salt, and macromolecular compounds are employed. As for lithium salt, $LiPF_6$, $LiAsF_6$, $LiBF_4$, $LiClO_4$, $LiCF_3SO_3$, $Li(CF_3SO_2)_2N$ or $LiC_4F_9SO_3$, are suitable and one kind or more than two kinds materials may be used by mixing among the above-mentioned materials. In the electrolyte layers 23, the concentration of lithium ion for nonaqueous solvents is preferably in the range of 0.10 to 2.0 mol/l. For this reason, the described range can be attained excellent ion conductivity.

As for nonaqueous solvents, for instance, ethylene carbonate, propylene carbonate, butylene carbonate, γ-butyl lactone, γ-valerolactone, diethoxyethane, tetrahydrofuran, 2-methyltetrahydrofuran, 1,3-dioxolane, methyl acetate, methyl propionicacid, dimethyl carbonate, diethyl carbonate, ethylmethyl carbonate, 2,4-difluoroanisole, 2,6-difluoroanisole, or, 4-bromoveratrol are suitable and one kind or more than two kinds materials may be used by mixing among the above-mentioned materials. In case of using laminate films described later as the package member 30, materials whose boiling point is above 150° C. such as ethylene carbonate, propylene carbonate, γ-butyl lactone, 2,4-difluoroanisole, 2,6-difluoroanisole, or, 4-bromoveratrol and so forth are preferably used, because easy vaporization causes bulges in the package member 30, which results in disfigured package.

As for macromolecular compounds, polyvinylydene fluoride, polyacrylonitrile, acrylonitrite butadiene-rubber, acrylonitrite butadiene stylene resin, acrylonitirite polyethylene chloride propylene diene stylene resin, acrylonitrite vinyl chloride resin, acrylonitrite metaaclylate resin, acrylonitrite acrylate resin, polyethylene oxide, or, polyether denatured siloxane are suitable and more than two kinds materials may be used by mixing among these materials. Copolymer made of polyvinylydene fluoride combined with hexafluoropropylene or with tetrafluoroethylene may be also used. Further, copolymer made of polyacrylonitrite combined with vinyl monomer such as vinyl acetate, methyl methacrylate, butyl methacrylate, methyl acrylic acid, butyl acrylic acid, itaconic acid, methyl acrylate hydroxide, ethyl acrylate hydroxide, acrylamid, vinyl chloride, vinylidene fluoride, or, vinylidene chloride may be used. Further more, copolymer made of polyethylene oxide combined with polypropylene oxide, methyl methacrylate, butyl methacrylate, methyl acrylic acid, or butyl acrylic acid may be used. In addition, vinylidine fluoride copolymer or ether denatured siloxane copolymer may be used.

Figure 4A:
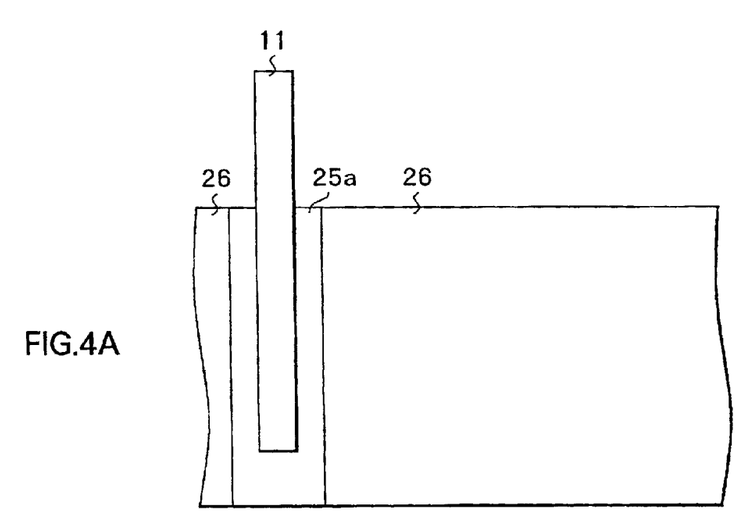
FIG. 4A is an enlarged plan view showing a part of a belt-shaped positive electrode.
Figure 4B:
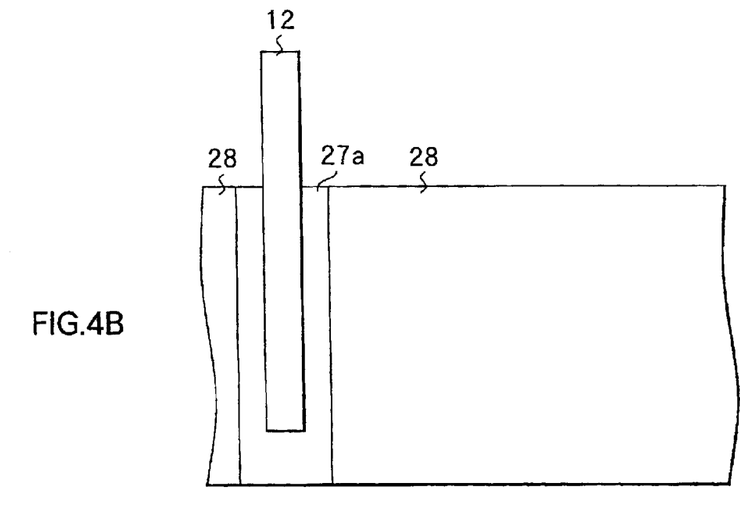
FIG. 4B is an enlarged plan view showing a part of a belt-shaped negative electrode.

In the coating machine illustrated in FIG. 5, after accommodating the electrolyte E in the tank 43, the belt-shaped positive electrode 21a is conveyed in a direction shown as A in FIG. 4 with the conveying roller 51, the backup roller 52 and the winding roller 53. While the belt-shaped electrode 21a is conveyed, in case that regions where the positive electrode mixture layers 26 are formed on the belt-shaped positive electrode 21a are opposite to the delivering open of the nozzle 41, the unillustrated shutter is withdrawn to open the flowing path 41b. In this state, the proportioning pump 44 is driven by an unillustrated driving mechanism with pressure in the range of 0.01 MPa to 0.3 Mpa. Thereby, the pressure is evenly applied on the electrolyte E which fills in the filling unit 41a of the nozzle 41 to push the electrolyte E in the range of 100 ml-min to 200 ml/min. Accordingly, the electrolyte layers 23 are formed with uniform thickness (for instance, the range of 5 $\mu$m to 100 $\mu$m) on a side of the positive electrode mixture layers 26. With the reason that the electrolyte E is pushed by pressure, even if a case that the lengths of the positive electrode mixture layers 26 are various on the surface and the back of the belt-shaped positive electrode collector 25a, a thickness of the electrolyte layers 23 is excellent in uniformity.

Figure 8A:
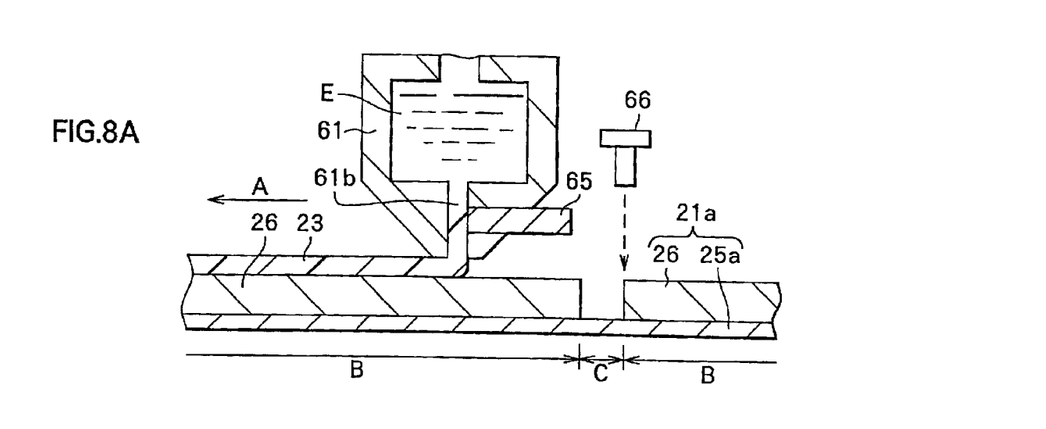
FIG. 8A is a cross sectional view showing a state where electrolyte E is delivered from the nozzle.
Figure 8B:
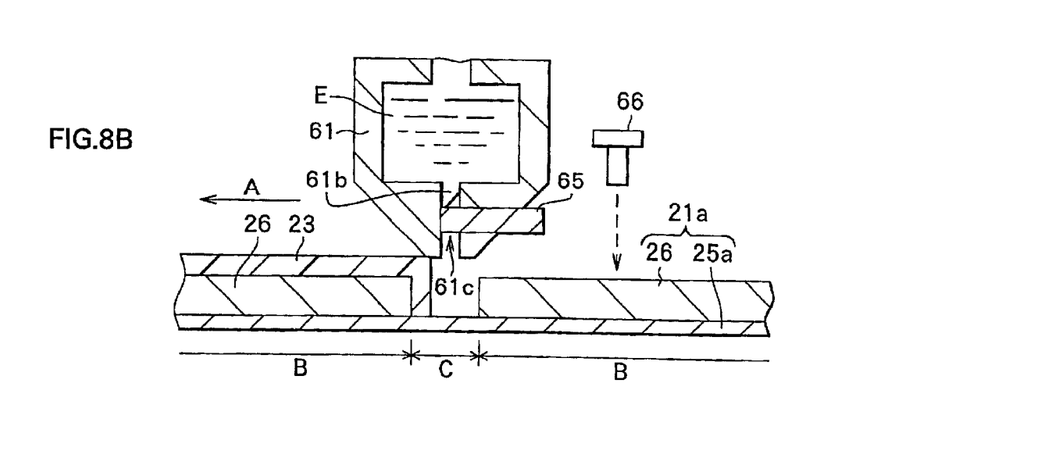
FIG. 8B is a cross sectional view showing a state where the electrolyte E stops to be delivered.

With a similar manner as mentioned above in the coating machine illustrated in FIG. 7, the belt-shaped positive electrode 21a is conveyed in the direction shown as A in FIG. 7 by the conveying roller 71 and the winding roller 72, and the electrolyte layers 23 are formed on the positive electrode layers 26 of the belt-shaped positive electrode 21a. FIG. 8A is a view showing a state where a positive electrode mixture layer exposed region B of the belt-shaped positive electrode 21a is positioned just under the delivering open 61c of the nozzle 61 and the electrolyte layers 23 are formed. On the other hand, FIG. 8B is a view showing a state where a collector exposed region C of the belt-shaped positive electrode 21a is positioned just under the delivering open 61c of the nozzle 61 and the supply of the electrolyte E stops.

Here, when the sensor 66 detects a boundary from the collector exposed region C of the belt-shaped positive electrode 21a to the positive electrode mixture layer exposed region B, on the basis of the detection timing, the shutter 65, that has been closed the flowing path 61b of the filling unit 61a under control of the controller 67 until this moment is withdrawn to open the flowing path 61b and the proportioning pump 64, which that has been stopped until this moment is driven with pressure in the range of 0.01 MPa to 0.3 Mpa. Thereby, as shown in FIG. 8A, the electrolyte E is delivered from the delivering open 61c of the nozzle 61 and applied on the positive electrode mixture layer 26 to form the electrolyte layers 23.

Following this, when the sensor 66 detects a boundary from the positive electrode mixture layer exposed region B to a collector exposed region C, on the basis of the detection timing, the shutter 65, which has been opened the flowing path 61b until this moment is protruded inside the flowing path 61b to close the flowing path 61b and the proportioning pump 64 stops. As a result of this, the electrolyte E stops to be delivered from the nozzle 61b. Thereby, as shown in FIG. 8B, in the collector exposed region C, there is a state that the electrolyte layers 23 are not formed and the belt-shaped positive collector 25a is exposed. After this, when the sensor 66 again detects a boundary from the collector exposed region C of the belt-shaped positive electrode 21a to a positive electrode mixture layer exposed region B, the electrolyte layers 23 are formed on the positive electrode mixture layers 26 in a like manner as mentioned above. The same procedures repeat again hereinafter.

Here, with the reason that the sensor 66 detects the boundaries between the collector exposed region C and the positive electrode mixture layer exposed regions B and on the basis of the detecting signal, the controller 67 controls the proportioning pump 64 and the shutter 65, the electrolyte layers 23 are selectively formed on a plurality of the positive electrode mixture layers 26 formed on the belt-shaped positive electrode collector 25a at a fixed interval. In connection with this, although the electrolyte layers 23 are formed in a manner to cover whole faces (that is, a top face and side faces) of the positive electrode mixture layers 26, the electrolyte layers 23 may be formed only on the top face except the side faces of the positive electrode mixture layers 26.

In the both coating machines shown in FIGS. 5 and 7, when the electrolyte E is applied from the nozzles 41 and 61, if it possesses viscosity in the rage of 0.001 Pa·s to 0.05 Pa·s, the electrolyte E passes through the flowing paths 41b and 61b smoothly. In addition, the viscosity of the electrolyte E is adjustable as mentioned hereinafter. First, an unillustrated oil bath is provided in the vicinity of the filling units 41a and 61a, and oil is heated inside the oil bath and circulated in order to heat the electrolyte E. As for another way, the viscosity of the electrolyte E is also adjustable by adding nonaqueous solvents, which has a low boiling point.

In connection with this, in the vicinity of the winding rollers 53 and 72 of the both coating machines shown in FIGS. 5 and 7, driers 54 for drying the applied electrolyte are disposed. In FIG. 7, the dryer 54 is unillustrated. The formed electrolyte layers 23 are conveyed to a position corresponding to the dryer 54, and the electrolyte dries. After this, the electrolyte layers 23 and the belt-shaped positive electrode 21a are covered with an unillustrated plastic film made of polypropylene together, and rolled by the winding rollers 53 and 72. As for this reason of covering it with the plastic film as mentioned above, it prevents nonaqueous solvents in the electrolyte layers 23 from evaporating or the electrolyte layers 23 from absorbing the water.

As in the described manner, the electrolyte layers 23 are intermittently formed on the belt-shaped negative electrode (the negative electrode mixture layers are intermittently disposed on the belt-shaped negative electrode collector).

Producing the belt-shaped negative electrode is conducted with the following manners. First, lithium metal, lithium alloy such as alloy of lithium and aluminum, or negative electrode materials capable of occluding and releasing lithium are mixed with binders such as polyvinylidene fluoride uniformly, then diffused to solvents such as dimethyl formaldehyde or N-methylpyrrolidone so as to make negative electrode slurry. After this, the negative electrode slurry is intermittently applied on a surface and a back of the belt-shaped negative electrode collector made of metal foil such as copper (Cu) foil, then the negative electrode slurry applied onto the belt-shaped negative electrode collector is dried and subjected to compression molding.

As for the negative electrode materials capable of occluding and releasing lithium, materials including one kind or more than two kinds materials among carbonaceous materials, silicon, or silicon compounds, metal oxide or macromolecule materials can be employed. As for the carbonaceous materials, pyrocarbons, cokes such as pitch coke, needle coke, or petroleum coke, graphites, glassy carbons, organic macromolecular compounds such that cellulose, phenolic resin, or furan resin are baked at proper temperature, carbon fiber or activated carbon can be employed. As for the silicon compounds, $Mg_2Si$ can be employed. As for the metal oxide, $SnO_2$ can be employed. As for the macromolecule materials, polyacetylene, polyaniline, polypyrrole, or disulfide polymer can be employed.

The belt-shaped positive electrode and the belt-shaped negative electrode on which a plurality of the electrolyte layers is intermittently formed respectively are pulled from the winding roller, and plastic films covering the belt-shaped positive and negative electrodes are stripped respectively.

Following this, the positive electrode lead 11 made of aluminum is attached to a region 25a where the belt-shaped positive electrode collector is exposed between the positive electrode mixture layers 26 by welding or adhesive material. On the other hand, the negative electrode lead 12 made of copper is attached to a region 27a where the belt-shaped negative electrode collector is exposed between the negative electrode mixture layers 28 by welding or adhesive material.

Then, with cutting, the belt-shaped positive electrode collector is cut between the electrolyte layers 23 to separate individually. As a result of this, a plurality of stacked bodies having the positive electrode lead 11 and sequentially formed the positive electrode mixture layers 26 and the electrolyte layers 23 on the positive electrode collector 25, is formed. With the same manner, the belt-shaped negative electrode collector is cut between the electrolyte layers 23 to separate individually. As a result of this, a plurality of stacked bodies having the negative electrode lead 12 and sequentially formed the negative electrode mixture layers 28 and the electrolyte layers 23 on the negative electrode collector 27, is formed. After this, as shown in FIGS. 2 and 3, the stacked bodies are laminated in a manner to face each of the electrolyte layers 23 with the separator 24 in-between and rolled to form the rolled electrode 20. The separator 24 is made of a porous film whose main base is polyolefin material such as polypropylene or polyethylene. A material stacked more than two kinds of this kind of porous film may be used.

After forming the rolled electrode 20, for instance, the pair of the films 30a and 30b which is comprised of the package member 30, is prepared. The rolled electrode 20 is sandwiched between the film 30a and the film 30b. In the ends of each of the films 30a and 30b where the positive electrode lead 11 and the negative electrode lead 12 are led, the films 31 are positioned in a manner to sandwich the positive electrode lead 11 and the negative electrode lead 12. Then, the positive electrode lead 11 and the negative electrode lead 12 are sandwiched respectively by the package member 30 with the films 31 in-between.

As for the pair of the films 30a and 30b, for instance, the laminate film, which a nylon film, aluminum foil, and a polyethylene film are laminated in this order, is employed and the polyethylene film is deposited in a manner to be opposite to the rolled electrode 20. The film 30a, one of the films is shaped in a manner to be rounded off with remaining outmost parts corresponding to a shape of the rolled electrode 20 accommodated therein.

After sandwiching the rolled electrode 20 with the films 30a and 30b, in a low pressure atmosphere, the package member 30 is subjected to compression bonding with the rolled electrode 20, and each of outmost parts of the films 30a and 30b is stuck firmly by means of heat seal and so on. This completes the secondary battery shown in FIG. 1.

In the secondary battery manufactured as mentioned above, when charging, lithium is released as an ion from the positive electrode mixture layers 26 and occluded to the negative electrode mixture layers 28 via the electrolyte layers 23 and the separator 24. On the other hand, when discharging, lithium is released as an ion from the negative electrode mixture layers 28 and occluded to the positive electrode mixture layers 26 via the electrolyte layers 23 and the separator 24.

Figure 6:
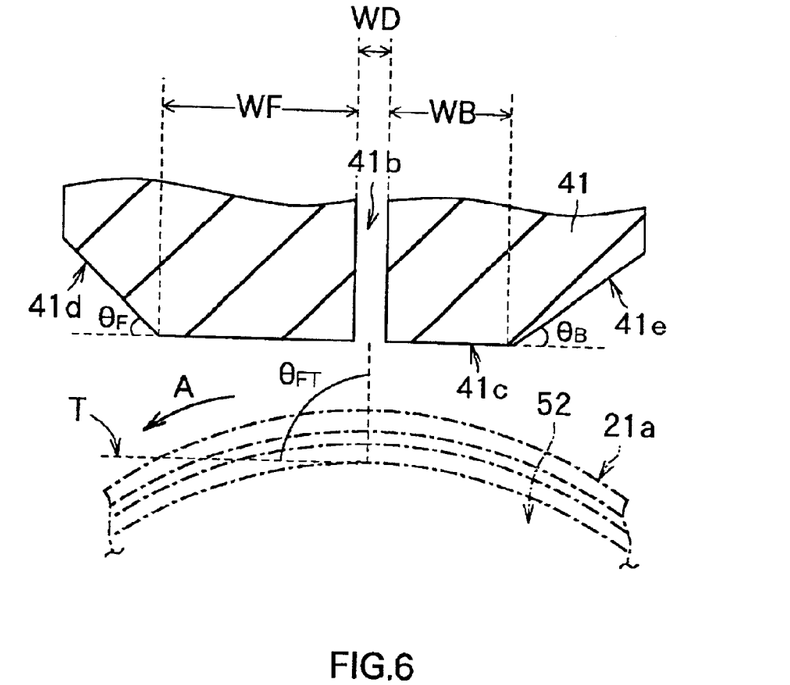
FIG. 6 is an enlarged cross sectional view showing a part of a nozzle illustrated in FIG. 5.

Next, with reference to FIG. 6, the nozzle 41 of the electrolyte-delivering machine 40 shown in FIG. 5 will be explained in detail. FIG. 6 is an enlarged view showing a part of the nozzle 41.

In FIG. 6, a top part of the nozzle 41 includes a tip surface 41c orthogonal to the flowing path 41b, inclined faces 41d and 41e inclined at a predetermined angles from the top face 41c. A width WF of the top face 41c is positioned closer to a side of a conveying direction (a direction shown as A in FIG. 6) than the flowing path 41b is, and is the range of 2 mm to 4 mm. On the other hand, a width WB of the top face 41c is positioned opposite to the conveying direction than the flowing path 41b is, and is in the range of 1 mm to 3 mm. The width WF and WB are an example of which a width WD of the flowing path 41b is determined in the range of 0.1 mm to 0.4 mm. The exterior angle θF at which the inclined face 41d in the conveying direction forms with the top face 41c is in the range of 50° to 120°. The exterior angle θB at which the inclined face 41e in the direction opposite to the conveying direction forms with the top face 41c is in the range of 10° to 45°. As described above, the inclined faces 41d and 41e are provided to prevent the electrolyte from accumulating in puddle when being delivered. It is considered that surfaces of the delivered electrolyte (the electrolyte layers 23) from the nozzle 41 changes in response to a shape of the top part of the nozzle 41, therefore, a structure including the top face 41c orthogonal to the flowing path 41b can achieve the surfaces of the electrolyte layers 23 in a good condition.

The nozzle 41 is preferably disposed in a manner that the top face 41c is almost parallel to a tangent T of the backup roller 52. That is, the flowing path 41b is preferably disposed orthogonal to the tangent T of the back up roller 52. Specifically, the angle θFT at which the flowing path 41b forms with the tangent T is in the range of 80° to 100°, and the electrolyte is preferably pushed in a direction such that the angle θFT at which the flowing path 41b forms with the tangent T is in the range of 80° to 100°.

Obviously many modifications and variations of the present invention are possible in the light of the above teachings. It is therefore to be understood that within the scope of the appended claims the invention may be practiced otherwise than as specifically described.

EXAMPLE

Here, the effect achieved by determining that the angle θFT is in the range of 80° to 100° will be described on the basis of specific examples.

Here, as Examples 1–9, with a coating machine similar to the coating machine shown in FIGS. 5 and 6, electrolyte was applied on the electrode mixture layer, varying the angle θFT at which the flowing path 41*b* forms with the tangent T in which the electrolyte was applied in the backup roller 52. The angle θFT at which the flowing path 41*b* forms with the tangent T in each of Examples are shown in Table 1. As for the electrolyte, a material such that polyvinylidne fluoride was dissolved into a solvent which ethylene carbonate, propylene carbonate, and γ-butyl lactone were mixed and further $LiPF_6$ was dissolved thereto, was employed. Diethyl carbonate evaporates and was removed when electrolyte was dried. As for the belt-shaped electrode collector, aluminum was employed. As for electrode mixture, a material such that $LiCoO_2$, carbon black, and polyvinilidene fluoride were diffused to N-methylpyrrolidone, was employed.

TABLE 1

| | (degree) | |
|---|---|---|
| Example 1 | 90 | Excellent |
| Example 2 | 87 | Excellent |
| Example 3 | 85 | Almost Excellent |
| Example 4 | 80 | Uneven Coating is observed in small parts |
| Example 5 | 78 | Uneven Coating is observed in large parts |
| Example 6 | 93 | Excellent |
| Example 7 | 95 | Almost Excellent |
| Example 8 | 100 | Streaky Coating is observed in small parts |
| Example 9 | 102 | Streaky Coatings is observed in large parts |

The surfaces of the applied electrolyte in each of Examples were observed visually, and then the results shown in Table 1 were achieved. In Table 1, the term "uneven coating" means that a thickness of the applied electrolyte is uneven, and the term "streaked coating" means electrolyte is partially thin. As understood from Table 1, in case that the angle θFT was 78° (Example 5) and 102° (Example 9), the uneven coating or the streaked coating occurred, so that the electrolyte could not be applied evenly. In case that the angle θFT was determined as from 80° to 100°, and the electrolyte was pushed from a direction within a range the angle θFT at which the flowing path 41*b* formed with the tangent T was from 80° to 100°, electrolyte could be applied evenly.

Here, although specific explanation is omitted, in case that copper foil was employed as the belt-shaped electrode collector, and a material such that graphite and polyvinilidene fluoride were diffused to N-methyl pyrolidone, was employed as the electrode mixture, the same results were obtained.

Next, with reference to FIGS. 9A and 9B, an effect of intermittently forming the electrolyte layers 23 will be described.

Figure 9A:
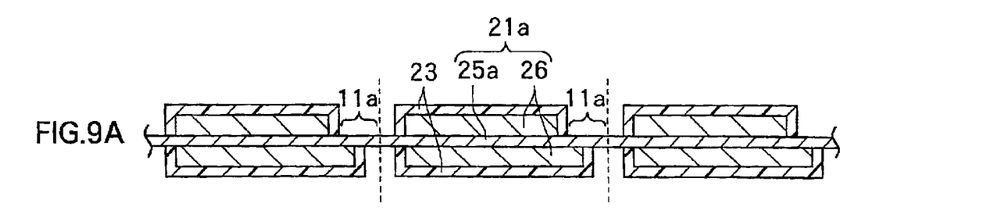
FIG. 9A is a cross sectional view showing the belt-shaped positive electrode manufactured by a method of the present invention.

FIG. 9A is a view showing a state after the electrolyte layers 23 were intermittently formed on the belt-shaped positive electrode 21*a* with the described before. On the other hand, FIG. 9B is a view showing a state after electrolyte layers 123 were formed on the whole face of belt-shaped positive electrode 121*a*, which a plurality of positive electrode mixture layers 126 was intermittently formed on both faces of belt-shaped positive electrode collector 125*a*. To be specific, the electrolyte layers 123 were formed such that the belt-shaped positive electrode 121*a* was impregnated inside the tank accommodating the electrolyte and scraped the electrolyte adhering to the both faces of the belt-shaped positive electrode with a pair of scoops (doctor knives).

Figure 9B:
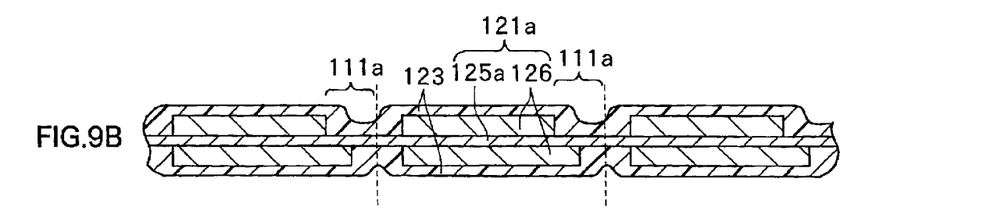
FIG. 9B is a cross sectional view showing the belt-shaped positive electrode manufactured by a conventional method.

In a conventional method shown in FIG. 9B, for electrically connecting the positive electrode lead 11 (see FIG. 4A) to the belt-shaped positive electrode 121*a* (specifically, the belt-shaped positive electrode collector 125*a*), the electrolyte stacked on a positive electrode lead attachment region 111*a* must be stripped and the positive electrode lead is attached thereto.

On the other hand, in the belt-shaped positive electrode 21*a* of the embodiment, the electrolyte layers 23 were only formed on the positive electrode mixture layers 26, which prevents adhesive of the electrolyte to a positive electrode lead attachment region 11*a*, thus, the above-mentioned stripped process is unnecessary and the positive electrode lead 11 can be attached to the positive electrode lead attachment region 11*a* easily.

As described above, according to the method of manufacturing the battery relative to the embodiment, with the proportioning pump, the electrolyte is applied to pressure evenly to push the electrolyte from the nozzle, so that a given amount of the electrolyte can be delivered. Thereby, the electrolyte layers, which are thin and even in thickness in width and longitudinal directions can be formed and an amount of the electrolyte included in each of the batteries can be uniform. Additionally, even if that any accidents happen while conveying the electrode, the electrolyte stops to be delivered by stopping the proportioning pump, which can controls coating failures and conduct product control in an electrolyte layer forming process.

After a plurality of the electrode mixture layers (the positive electrode mixture layer and the negative electrode mixture layer) is intermittently formed on the belt-shaped electrode collectors (the belt-shaped positive electrode collector and the belt-shaped negative electrode collector) and further the electrolyte layers are formed thereon, the belt-shaped electrode collectors are cut, which does not cause adhesive of the electrolyte to the lead attachment region. As a result of this, the conventional stripping process becomes unnecessary, which can enhance productivity. Additionally, the electrolyte is not applied to unnecessary parts, which decrease product cost.

Further, when forming the electrolyte layers, the coating machines relative the embodiment are employed, so that the sensor detects a boundary from the electrode mixture layer exposed region and the electrode collector exposed region, and on the basis of the detecting signal, the controller can control the proportioning pump and the shutter. Hence, the electrolyte can be applied intermittently, which can enhance productivity of the battery.

Figure 10:
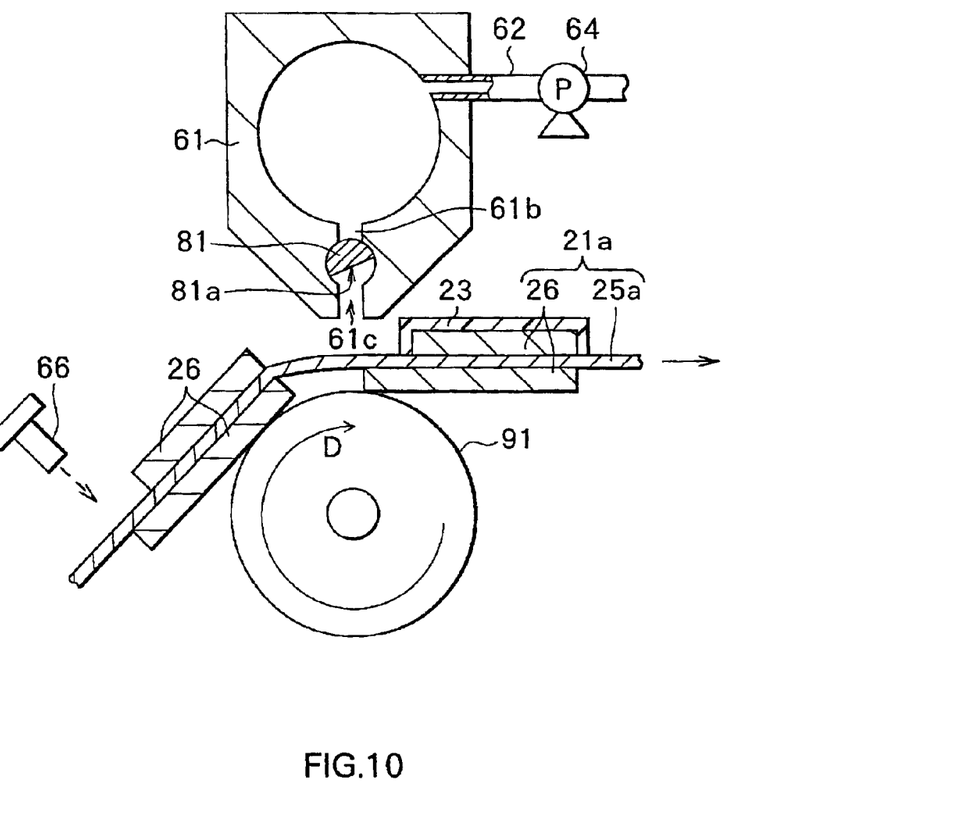
FIG. 10 is a cross sectional view partly showing a schematic configuration of a coating machine relative to a modification of the present invention illustrated in FIG. 7.

In connection with this, when forming the electrolyte layers, in replace of the coating machines shown in FIGS. 5 and 7, a coating machine shown in FIG. 10 can be employed. In explanation hereinafter, the same configuration elements as the coating machine shown in FIG. 7 has the same reference numerals and are omitted to describe in detail.

In a nozzle 61 of the coating machine shown in FIG. 10, a bearing whose cross section face is a circular shape is provided in the middle of a flowing path 61*b* of the electrolyte E and an open-and-close shaft is equipped with the bearing in a movable way. A part of the open-and-close shaft 81 is a notch (a notch 81*a*). The open-and-close shaft 81 is driven by an unillustrated driving mechanism in response to the timing when the electrolyte is applied or not applied. When applying the electrolyte, the notch 81*a* is positioned parallel to wall sides of the flowing path 61*b* and when not applying the electrolyte, the notch 81*a* passes across the flowing path 61*b*. Thereby, when applying the electrolyte, the electrolyte, which passes through the notch 81*a* by opening the flowing path 61*b* is delivered from a delivering open 61*c*. On the other hand, when not applying the electrolyte, the flowing path 61*b* closes.

The coating machine includes a backup roller 91, which is movable in a direction shown as an arrow D in FIG. 10 beneath the nozzle 61. Accordingly, an body-to-be-coated is conveyed from the conveying roller 51 (see FIG. 7) to the winding roller 52 (see FIG. 7) as the backup roller 91 guides.

Although the present invention is described by giving the embodiment, the present invention is not limited to the above-mentioned embodiment and can achieve various changes and modifications. For instance, although in the above-mentioned embodiment, the example such that the electrolyte layers are intermittently formed with the coating machine was described, when forming the electrode mixture layer on the belt-shaped electrode collector, the above-mentioned coating machine can be also employed. In this case, the tank accommodates the above-mentioned positive electrode slurry or the above-mentioned negative electrode slurry in order to form the positive electrode mixture layer or the negative electrode mixture layer on the electrode collector as a body-to-be-coated. Further, the coating machine for forming electrode mixture layer is disposed adjacent to the coating machine for forming the electrolyte layers thereby, enabling the electrode mixture layer and the electrolyte layers to be intermittently formed in a sequential way. The coating machines can be used not only in a case that the electrode mixture layer or the electrolyte layers are intermittently applied but also in a case that these layers can be applied continually.

Further more, although in the above-mentioned embodiment, the gel-type electrolyte layers are formed, electrolyte made of solid-type electrolyte in which electrolyte salt is diffused to macromolecular compounds having ion conductivity, or of solid-type inorganic electrolyte may be employed. Such solid-type electrolyte layers are gained by completely evaporating nonaqueous solvents after the electrolyte having flowability is applied on the electrode mixture layers.

Still further, although in the above-mentioned embodiment, the case where the electrode mixture layers are formed on the both faces of the belt-shaped electrode collector was described, a case where the electrode mixture layer is formed on a single face of the belt-shaped electrode collector can be applied. Although the electrolyte layers are formed on the both faces of the belt-shaped electrode, the electrolyte layer may be formed on a single face respectively.

Further more, although in the above-mentioned embodiment, the belt-shaped electrode collectors are cut after attaching the leads (the positive electrode lead 11 and the negative electrode lead 12) to the belt-shaped electrode collectors, the leads may be attached after cutting the belt-shaped electrode collectors. Additionally, although in the embodiment, the leads is attached after forming the electrolyte layers, the electrolyte layers may be formed after attaching the leads.

Much further, although in the above-mentioned embodiment, the battery has a structure such that the rolled electrode 20 is enclosed inside the laminate film was explained as an example, the present invention can be also applied when batteries in various shapes such as a coin shape, a button shape or a cylindrical shape are manufactured.

Further, although in the above-mentioned embodiment, the battery whose battery reaction is lithium was described, the present invention can be also applied when batteries whose battery reactions are other kinds such as sodium (Na), or calcium (Ca). In this case, as for electrolyte salt, in replace of lithium salt, sodium salt or calcium salt is employed, and as for the positive electrode active materials, metal oxide or metal sulfide and the like is employed.

In addition, although the case where the secondary battery is manufactured was described, the present invention can be applied when a primary battery is manufactured.

While the invention has been described with reference to specific embodiment chosen for purpose of illustration, it should be apparent that numerous modifications could be made there to by those skilled in the art without departing from the basic concept and scope of the invention.

What is claimed is:

1. A method of manufacturing a battery
having a positive electrode and a negative electrode, and an electrolyte layer, the method comprising the steps of:
conveying at least one electrode with a conveyor;
forming the electrolyte layer onto the electrode by applying an electrolyte, which is discharged from a delivery opening of a filling unit under pressure, onto the electrode as the electrode is conveyed to a position under the delivery opening; and
maintaining a thickness of the electrolyte layer by adjusting a roller that is positioned on a side of the conveyor opposite the delivery opening.

2. A method of manufacturing a battery according to claim 1, wherein the flow path of the electrolyte is at the delivery opening is in a direction such that the angle formed by the flow path and a tangent of the roller at a position closest to the delivery opening is in a range of 80° to 100°.

3. A method of manufacturing a battery according to claim 1, wherein heat is applied to the electrolyte for adjusting its viscosity as the electrolyte is applied to the electrode.

4. A method of manufacturing a battery according to claim 1, wherein heat is applied to the electrolyte for adjusting its viscosity to be within a range of 0.001 Pa·s to 0.05 Pa·s as the electrolyte is applied to the electrode.

5. A method of manufacturing a battery according to claim 1, comprising the steps of:
forming a plurality of electrolyte layers by intermittently applying the electrolyte on at least one face of at least one electrode, wherein the electrode has a belt shape; and
cutting the at least one electrode at a position formed intermittently between the electrolyte layers;
wherein the electrolyte is intermittently applied by an open-and-close movement of a shutter disposed in an electrolyte flowing path of the filling unit.

6. A method of manufacturing a battery according to claim 5, wherein the electrolyte layers are formed on a face of the at least one electrode; and
comprising a step of rolling the face of the at least one electrode with a plastic film.

7. A method of manufacturing a battery according to claim 1, wherein the electrolyte comprises at least one of electrolyte salt and a macromolecular compound.

8. A method of manufacturing a battery according to claim 1, wherein the electrolyte comprises at least one of electrolyte salt, macromolecular compound, and a nonaqueous solvent.

9. A method of manufacturing a battery according to claim 7, wherein the electrolyte comprises a lithium salt selected from the group consisting of $LiPF_6$, $LiAsF_6$, $LiBF_4$, $LiClO_4$, $LiCF_3SO_3$, $Li(CF_3SO_2)_2N$ and $LiC_4F_9SO_3$.

10. A method of manufacturing a battery according to claim 7, wherein the macromolecular compounds is selected from the group consisting of polyvinylidene fluoride, polyacrylonitrile, acrylonitrile butadiene-rubber, acrylonitrile butadiene stylene resin, acrylonitrile polyethylene chloride propylene diene stylene resin, acrylonitrile vinyl chloride resin, acrylonitrile meta aclylate resin, acrylonitrile acrylate resin, polyethylene oxide, polyether denatured siloxane, copolymer comprising polyvinylidene fluoride combined with another of said macromolecular compounds, copolymer comprising polyacrylonitrile combined with another of said macromolecular compounds, and copolymer comprising polyethylene oxide combined with another of said macromolecular compounds.

11. A method of manufacturing a battery according to claim 8, wherein the nonaqueous solvent is selected from the group consisting of ethylene carbonate, propylene carbonate, butylene carbonate, γ-butyrolactone, γ-valerolactone, diethoxyethane, tetrahydrofuran, 2-methyltetrahydrofuran, 1,3-dioxolane, methyl acetate, methyl propionicacid, dimethyl carbonate, diethyl carbonate, ethylmethyl carbonate, 2,4-difluoroanisole, 2,6-difluoroanisole and 4-bromoveratrol.

12. A method of manufacturing a battery according to claim 1, wherein when the electrode is a positive electrode the electrode includes a lithium mixed oxide having the formula $Li_xMO_2$ (where, x satisfies $0.05 \leq x \leq 1.12$, and M is more than one kind of transition metal); and wherein when the electrode is a negative electrode the electrode includes a material capable of occluding and releasing lithium selected from the group consisting of a carbonaceous material, silicon, a silicon compound, a metal oxide, and a macromolecular material.

* * * * *